(No Model.)

W. ECKER.
WIND WHEEL.

No. 357,471. Patented Feb. 8, 1887.

WITNESSES:
C. R. Bennett
H. E. Rowe

INVENTOR:
William Ecker,
BY Drake & Co. ATTYS.

United States Patent Office.

WILLIAM ECKER, OF NEWARK, NEW JERSEY.

WIND-WHEEL.

SPECIFICATION forming part of Letters Patent No. 357,471, dated February 8, 1887.

Application filed July 29, 1886. Serial No. 209,363. (No model.)

*To all whom it may concern:*

Be it known that I, WILLIAM ECKER, a citizen of the United States, residing at Newark, in the county of Essex and State of New Jersey, have invented certain new and useful Improvements in Wind-Wheels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a wind-wheel of increased strength and lightness and of greater durability and efficiency; and it consists in a wind-wheel having the arrangements and combinations of parts substantially as will be hereinafter set forth, and finally embodied in the clauses of the claim.

Figure 1:
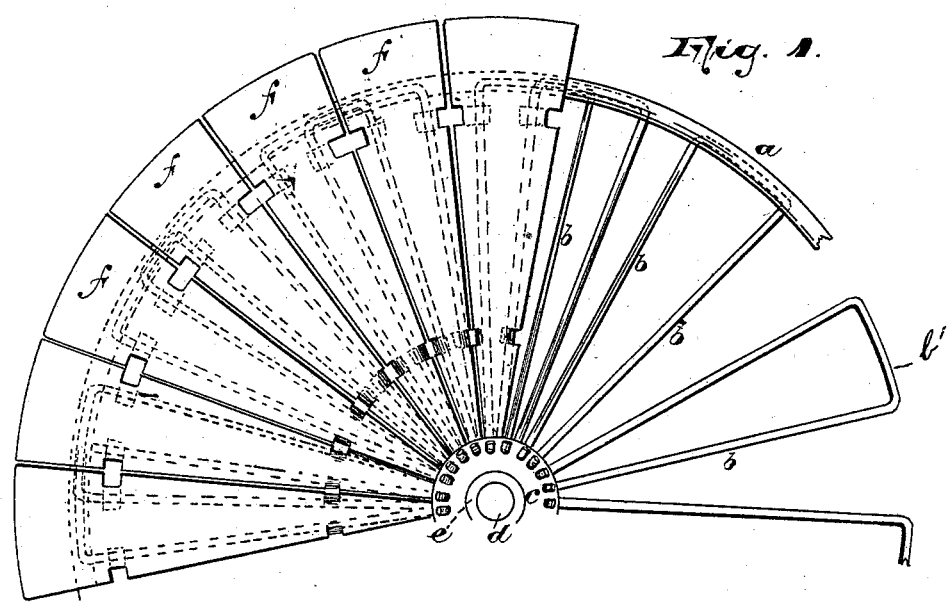
Figure 2:
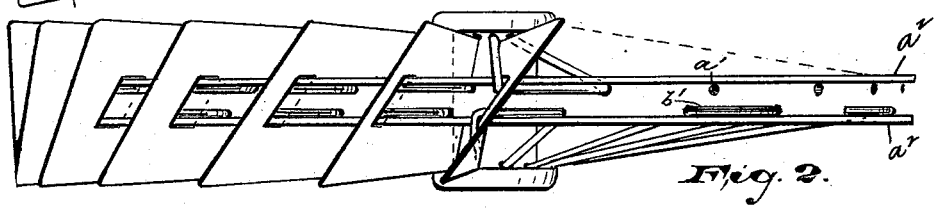
Figure 4:
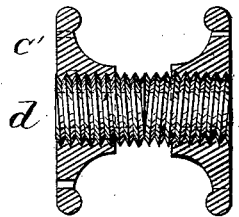
Figure 3:
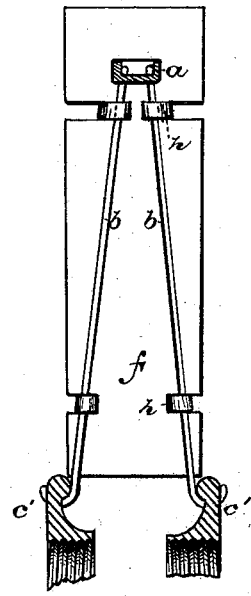

Referring to the accompanying drawings, in which like letters indicate corresponding parts in each of the figures, Figure 1 is a side elevation of a portion of a wind-wheel, showing the relations of the several parts to one another. Fig. 2 is a plan of the same. Fig. 3 is a rear face view of one of the fans or wings, showing its relation to the spokes of the wheel; and Fig. 4 is a detail view of a hub, partly in section.

In said drawings, $a$ indicates a tire, $b$ the spokes, and $c$ the hub, of a wheel, such as is commonly known as a "tension-wheel," and is in ordinary use in bicycles.

The peculiar construction of this class of wheels that I prefer to employ is shown in the drawings, in which a collar, $e$, working on a shaft, $d$, is provided with flanged and perforated rings $c'$ $c'$, which are threaded with right and left hand screw-threads to engage corresponding threads on the collar, and when turned, or the collar is turned, are adapted to move in opposite directions. The tire or peripheral connecting-ring $a$ of the wheel is connected or held in proper relative position to the hub by the spokes $b$ $b$, which are preferably of wire, and are formed in pairs, as shown more clearly at the right-hand side of Fig. 1, one end of the wire being first fastened to the ring by being hooked or otherwise fastened into the perforation therein, then passed up through one of the perforations $a'$ in the tire and back through a second perforation, and finally fastened in the hub, the spoke-wires being thus doubled, so that the number of fastened ends will be reduced and the wheel thereby be given greater strength and durability, and the wheel be more conveniently constructed and repaired. The complement of spokes being thus arranged and secured, tension is brought thereon by separating the rings $c'$, or in any other suitable manner, to give strength and firmness to the wheel.

To protect the connecting portions $b'$ of the spokes, and to secure stiffness and strength in the tire, I prefer to provide ribs $a^2$, (shown clearly in Figs. 2 and 3,) which may be formed to project from the periphery of the said tire. The spokes are disposed alternately and radially in the wheel, approach a central line or plane at the tire, and separate therefrom at the hub, as shown in Fig. 3. Against the spokes thus arranged are secured wings $f$, formed of thin plate metal—such as tin or iron, or of other suitable material—the same being bent to lie against the spokes and be strengthened thereby, and to lie at an angle to the plane of the wheel to receive the wind in the usual manner, so that the wheel is given motion. Said wings $f$ are perforated at or near their upper ends to allow a passage to the tire, and extend laterally in opposite directions from said tire, and thus present a broad and approximately unobstructed surface to the wind from a point radially beyond the tire to the hub.

I prefer to secure the plates to the spokes by means of tongues $h$, Fig. 3, which are cut from the plate metal and bent around the wires of the spokes, as shown clearly in Fig. 3.

A wheel thus constructed, while being of comparatively little weight, is of great strength, can be made in quantities at small cost, and is of great durability.

Having thus described the invention, what I claim as new is—

1. In combination, in a wind-wheel, a hub having separable rings $c'$ $c'$, a perforated tire and wire spokes, and wings fastened against said spokes, substantially as and for the purposes set forth.

2. In combination, in a wind-wheel, a collar having right and left hand threads, flanged rings $c'$ $c'$, wire spokes and a tire, and wings arranged against said spokes, substantially as and for the purposes set forth.

3. In combination, in a wind-wheel, a hub, a ribbed tire and wire spokes formed in pairs by being doubled, and fans or wings arranged against said spokes, substantially as set forth.

4. In combination, a wind-wheel having a hub provided with separable flanges, a tire and spokes connecting said hub and tire, and wings having tongues $h$ cut from said wings and bent around the spokes, substantially as set forth.

In testimony that I claim the foregoing I have hereunto set my hand this 20th day of July, 1886.

WILLIAM ECKER.

Witnesses:
CHARLES H. PELL,
OSCAR A. MICHEL.